(12) United States Patent  (10) Patent No.: US 7,465,864 B2
Heintz  (45) Date of Patent: Dec. 16, 2008

(54) MUSICAL INSTRUMENT TRAINING DEVICE WITH MULTIPLE MOUTHPIECES

(75) Inventor: David G. Heintz, Pike, NH (US)

(73) Assignee: Clarflupet, LLC, Pike, NH (US)

( * ) Notice: Subject to any disclaimer, the term of this patent is extended or adjusted under 35 U.S.C. 154(b) by 78 days.

(21) Appl. No.: 11/582,174

(22) Filed: Oct. 17, 2006

(65) Prior Publication Data

US 2008/0087159 A1  Apr. 17, 2008

(51) Int. Cl.
G09B 15/00 (2006.01)
G10F 1/22 (2006.01)

(52) U.S. Cl. .............. 84/470 R; 84/2; 84/93; 84/330; 84/380 R; 84/387 R; 84/398

(58) Field of Classification Search ........ 84/2, 84/93, 330, 380 R, 386, 398, 399, 450, 470 R
See application file for complete search history.

(56) References Cited

U.S. PATENT DOCUMENTS

| | | | |
|---|---|---|---|
| 2,146,179 A * | 2/1939 | Fitchhorn | 84/383 R |
| 2,504,547 A | 4/1950 | Legler | |
| 3,224,315 A * | 12/1965 | Guinness | 84/383 R |
| 3,451,302 A * | 6/1969 | Lamart | 84/465 |
| 3,853,034 A * | 12/1974 | Vale | 84/465 |
| 4,304,166 A | 12/1981 | Stefano et al. | |
| 4,378,724 A * | 4/1983 | Lamart | 84/465 |
| 4,658,697 A * | 4/1987 | Wean | 84/465 |
| 4,909,123 A | 3/1990 | Butenschon, III et al. | |
| 5,027,685 A | 7/1991 | Lenz | |
| 6,924,424 B2 | 8/2005 | Seuta, Jr. et al. | |
| 2006/0156897 A1 | 7/2006 | Abernathy | |

* cited by examiner

*Primary Examiner*—Jeffrey Donels
*Assistant Examiner*—Christopher Uhlir
(74) *Attorney, Agent, or Firm*—McLane, Graf, Raulerson & Middleton, P.A.; Scott C. Rand

(57) ABSTRACT

A musical instrument training device, system, and method are provided for teaching a plurality of wind instrument embouchures. The instrument includes an elongate body having first end and a second end opposite the first end and defining an internal bore extending longitudinally between the first and second ends. A single-reed instrument mouthpiece is coupled to the first end and a brass instrument mouthpiece is coupled to the second end. In a preferred, more limited aspect, a lateral flute embouchure tone hole is formed in the wall of the elongate body.

19 Claims, 5 Drawing Sheets

MUSICAL INSTRUMENT TRAINING DEVICE WITH MULTIPLE MOUTHPIECES

BACKGROUND

The present disclosure relates to musical instruments and, more particularly, to musical instrument instructional devices with multiple mouthpieces. The embodiments described herein are particularly well suited for use as an instrumental music teaching aid.

Commonly, beginning instrumental music students select an instrument for reasons which do not take into account whether the instrument selected is an instrument for which the student is well suited. For example, some students select an instrument that their family already owns or that someone in their family plays or once played. Others play what a friend wants to play. Others may be attracted to an instrument based on appearance or sound. One drawback of such methods for selecting an instrument is that the instrument selected may be one that the student finds difficult to play, or is otherwise not well suited to play. In such cases, the student may feel that he or she lacks musical talent and lose interest in playing music, even when the difficulty arises from an inadequate match between the student and instrument.

Ideally, students would be given an opportunity to experience playing a variety of instruments before selecting a specific instrument for in-depth study. However, due to time, financial and logistical constraints, particularly in an elementary band or other school setting, it is typically not possible to supply a sufficient number of instruments to give each student an opportunity to do so.

Accordingly, the present disclosure contemplates new and improved musical instrument devices which overcome the above-referenced problems and others.

Although the present embodiments are described herein primarily for use as music instrument training devices or teaching aids, it will be recognized that the embodiments herein may be employed in connection with a myriad of educational and other musical settings.

SUMMARY

In one aspect, a musical instrument training device is provided having an elongate body having first end and a second end opposite the first end, the elongate body defining an internal bore extending longitudinally between the first and second ends. A single-reed instrument mouthpiece is coupled to the first end and a brass instrument mouthpiece is coupled to the second end. In a preferred, more limited aspect, the device further includes a lateral tone hole formed in a wall of the elongate body.

In another aspect, a kit having component parts capable of being packaged in a disassembled or partially disassembled form and of being assembled into a musical instrument training device having a plurality of wind instrument mouthpiece types is provided. The kit includes an elongate body having first end and a second end opposite the first end. The elongate body defines an internal bore extending longitudinally between the first and second ends. The kit also includes a single-reed instrument mouthpiece adapted to be coupled to the first end and a brass instrument mouthpiece adapted to be coupled to the second end. In a preferred, more limited aspect, the elongate body includes a lateral tone hole formed in a wall of the elongate body.

In yet another aspect, a musical instrument training system comprises a plurality of musical instrument training devices, each including an elongate body having first end and a second end opposite the first end, the elongate body defining an internal bore extending longitudinally between the first and second ends. A single-reed instrument mouthpiece is coupled to the first end and a brass instrument mouthpiece is coupled to the second end. In a preferred, more limited aspect, the elongate body includes a lateral tone hole formed in a wall of the elongate body.

In still another aspect, a method of teaching a student proper embouchures for playing a plurality of instruments comprises providing a musical instrument training device including an elongate body having first end and a second end opposite the first end, the elongate body defining an internal bore extending longitudinally between the first and second ends. A single-reed instrument mouthpiece coupled to the first end and a brass instrument mouthpiece coupled to the second end. Optionally, a lateral tone hole is provided in a wall of the elongate body to provide a transverse flute mouthpiece. For each mouthpiece, the musical instrument training device is configured to produce a specific pitch when played with a proper embouchure. The student is allowed to play the musical instrument training device to produce a tone using each mouthpiece. For each mouthpiece, the pitch of the tone produced by the student is compared to the specific pitch for each mouthpiece. In a preferred, more limited aspect, the elongate body includes a lateral tone hole formed in a wall of the elongate body.

One advantage of the presently disclosed device is that it allows students to experience a plurality of wind instrument embouchures before selecting an instrument for lessons or beginning a band class. In this manner, the student is more likely to select an instrument which is an appropriate match for the student. Because multiple instrument mouthpieces are provided on a single instrument, such training may be provided to each student on multiple instrument types without the expense of obtaining multiple instruments.

Another advantage of the present device resides in its ability to be used in a variety of settings including, without limitation, single-session or longer exploratory courses, quarter-, semester-, or year-long curricular courses, and with a variety of students including, without limitation, beginning or pre-band students, parents of band students, high school or college instrumental pedagogy students, and students with special learning needs or physical handicaps, among others.

Another advantage of the present development is found in that it can be integrated with educational lessons or units on percussion and other instrument techniques, rhythmic notation, performance, composition, improvisation, or the science or physics of sound, among others.

Other benefits and advantages of the present disclosure will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings, wherein like reference numerals are used for like components throughout the several views, are only for purposes of illustrating preferred embodiments and are not to be construed as limiting the invention.

DETAILED DESCRIPTION OF THE PREFERRED EMBODIMENTS

Figure 1:
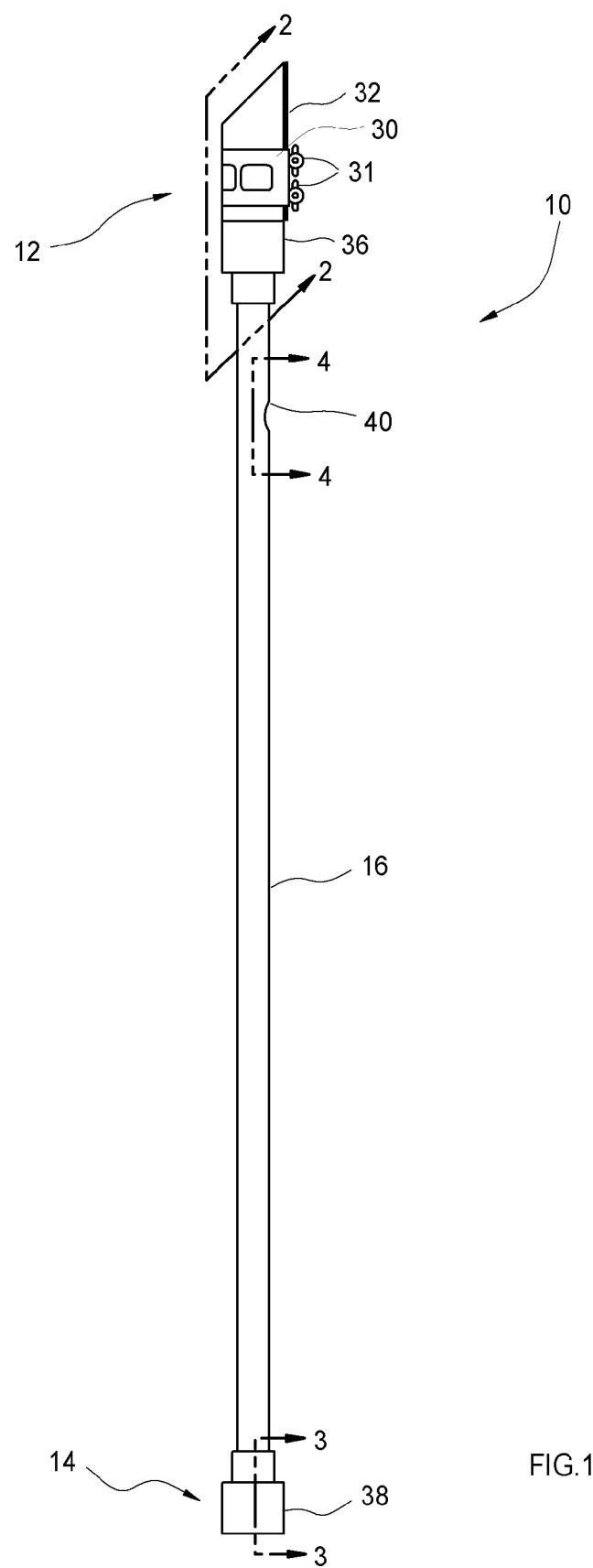
FIG. 1 is a side view of a musical instrument training device in accordance with a first exemplary embodiment.

Referring now to FIGS. 1-4, there is shown a first embodiment musical instrument training device 10 having a first end 12 and a second end 14 opposite the first end. The device 10 includes an elongate pipe or tube 16 defining a hollow bore or channel 18. The tube 16 and internal bore 18 are preferably cylindrical although other geometric configurations are contemplated.

The first end 12 of the device 10 includes an opening 20 sized to receive a single-reed wind instrument mouthpiece 22. The mouthpiece 22 includes a base 24 received within the opening 20. The mouthpiece 22 includes an opening 26 and an internal chamber 28 in fluid communication with the internal bore 18. A ligature 30 circumscribes the mouthpiece and removably secures a reed 32, which may be formed of natural cane or a synthetic material, against a flattened or table portion 34 closely over the opening 26 when the instrument 10 is to be played in the manner of a single-reed instrument. When the device 10 is played using the single-reed instrument mouthpiece 22, the player's breath causes the reed 32 to vibrate, which in turn causes the air in the bore 18 to vibrate and produce a sound.

The ligature 30 may be selectively secured and released by alternately tightening and loosening thumb screws 31. As used herein, the term "ligature" is intended to refer generally to any fastener for securing the reed in position over the opening in the mouthpiece and may be of a type that is removable from the mouthpiece, or, may be of a type that is integral or permanently attached to the mouthpiece. The ligature 30 is exemplary only and it will be recognized that other types of ligatures may be employed as well, including without limitation the alternative ligatures shown and described herein and any other known or conventional single-reed mouthpiece ligatures.

Figure 5:
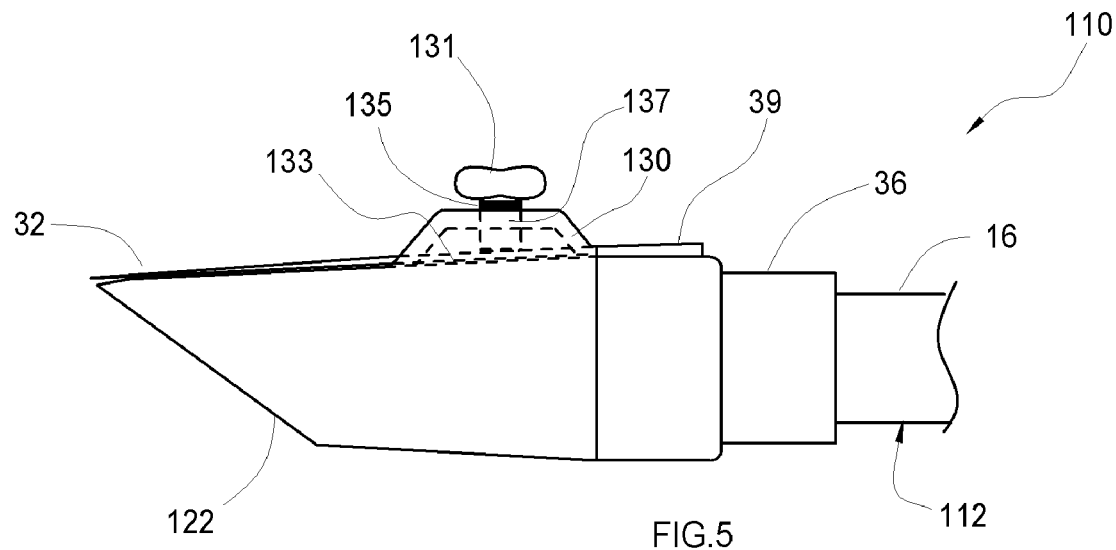
FIG. 5 is a fragmentary view of an alternative embodiment employing a single-reed mouthpiece having an integral ligature.

Referring now to FIG. 5, there is shown in fragmentary view a first end 112 of an alternative embodiment device 110 having a single-reed instrument mouthpiece 122. The alternate mouthpiece 122 includes an integrally-formed ligature 130 in place of the conventional ligature 30 appearing in the embodiment of FIG. 1. The integral ligature 130 includes a longitudinally extending slot or channel 133 for slidingly receiving the butt end 39 of the reed 32 and a set or thumb screw 131 for securing the reed in place on the mouthpiece. The set screw 131 includes a threaded shaft 135 which rotatably engages a complimentary tapped opening 137 in the ligature portion 130. The set screw 131 may be rotated in a first direction to cause it to bear against the butt end 39 of the reed 32 and thereby secure the reed 32 in place, e.g., when the unit is to be played using the reed mouthpiece 122. The set screw 131 may be rotated in a second direction to loosen the reed, e.g., for removing the reed from the reed mouthpiece 122.

With continued reference to FIGS. 1-4, the base portion 24 of the mouthpiece 22 may be removably received within the opening 20, for example, via a frictional fit. Optionally, a sealing ring or annular gasket 25, such as a layer of cork or other resilient material, may be provided on the outer surface of the base 24 and/or the interior-facing surface of the opening 20 to provide a secure, airtight fit between the base portion 24 and the opening 20. Alternatively, the base portion 24 may be permanently secured within the opening 20, e.g., via an adhesive. In another alternative embodiment, the mouthpiece 22 may be integrally formed with the pipe 16.

The tube 16 may be formed of a plastic pipe material, such as PVC or CPVC. The first end 12 may include a pipe fitting 36 of a size adapted to receive the single-reed mouthpiece 22. Alternatively, other materials may be used for the elongate body 16 and/or fitting 36, including without limitation plastic, wood, metal or metal alloy, and so forth.

Figure 2:
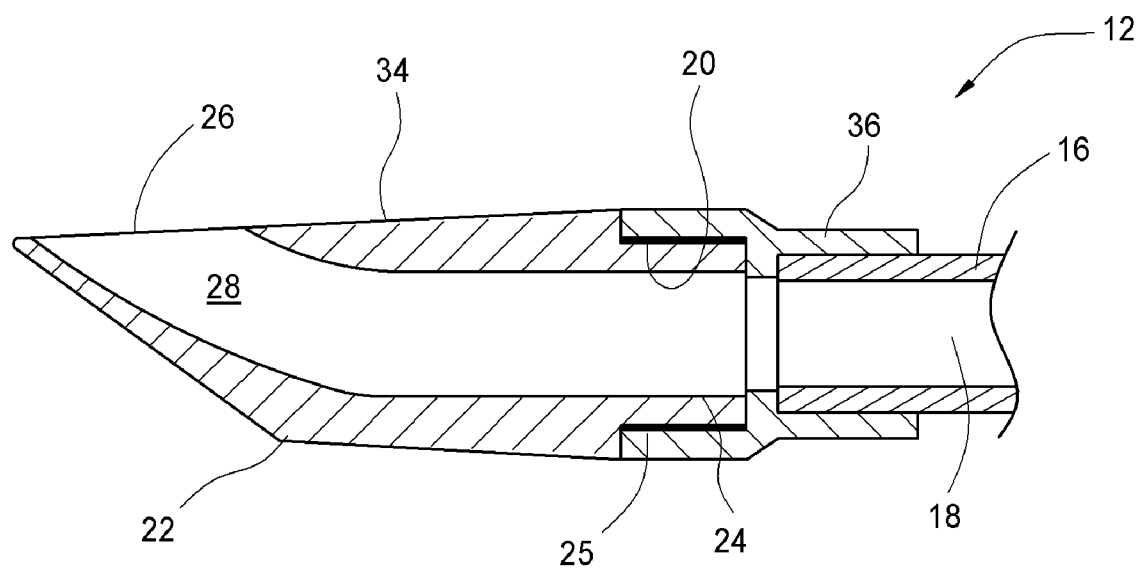
FIG. 2 is an enlarged, fragmentary cross-sectional view of the embodiment shown in FIG. 1 with the reed removed, taken along the lines 2-2 in FIG. 1.

The mouthpiece 22 depicted in FIGS. 1 and 2 is preferably a standard soprano (e.g., Bb) clarinet mouthpiece and will be described herein primarily by way of reference thereto. However, it will be recognized that the musical instrument training device disclosed herein may be adapted for use with any other single-reed wind instrument mouthpiece, such as mouthpieces for other members of the clarinet family, the saxophone family, and the like.

The device 10 additionally includes a brass mouthpiece 38. As used herein, the terms "brass mouthpiece" or "brass instrument mouthpiece" are intended to refer to any generally cup-shaped mouthpiece of a type employed for playing instruments of the brass family, irrespective of the material from which the mouthpiece and/or the instrument is made. Thus, the mouthpiece 38 may be any cup-shaped mouthpiece that can be played by vibrating or buzzing the lips thereagainst in order to cause vibration of the air within the interior bore 18 and to thereby produce a sound. The brass mouthpiece may be removably attached to the elongate body portion or may be permanently attached or integral to the elongate body.

In operation, when played using the brass instrument mouthpiece 38, the reed 32 is preferably removed from the mouthpiece 22 to allow air to exit the opening 26, although a tone may still be produced when the mouthpiece 38 is played with the reed 32 in place on the mouthpiece 22.

Figure 3:
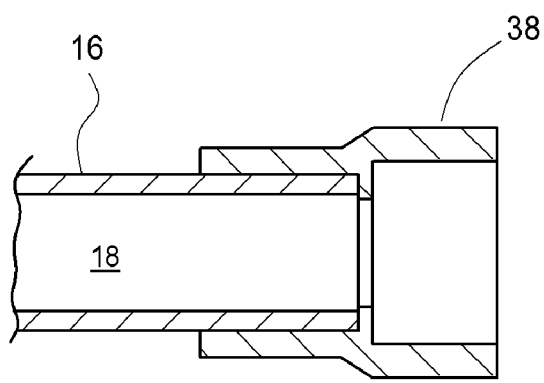
FIG. 3 is an enlarged, fragmentary cross-sectional view taken along the lines 3-3 in FIG. 1.
Figure 4:
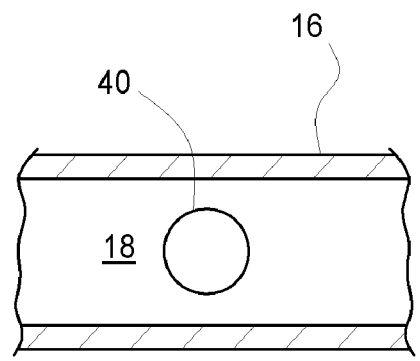
FIG. 4 is an enlarged, fragmentary cross-sectional view taken along the lines 4-4 in FIG. 1.

As best seen in FIGS. 1-3, the mouthpiece 38 may be of the same type as the fitting 36 provided at the end 12 for receiving the reed mouthpiece 22. In this manner, the instrument may be constructed inexpensively and in facile manner from a length of plastic pipe having a pipe fitting at each end, and a standard clarinet or other single-reed mouthpiece. In a preferred embodiment, the tube 16 may be formed of a length of commercially available ½-inch diameter plastic pipe and the fitting 36 and mouthpiece 38 may each be a commercially available ½-inch to ¾-inch plastic pipe coupling. The couplings 36 and 38 may be attached at the first and second ends 12 and 14, respectively, via an adhesive such as plastic pipe cement.

Figure 6:
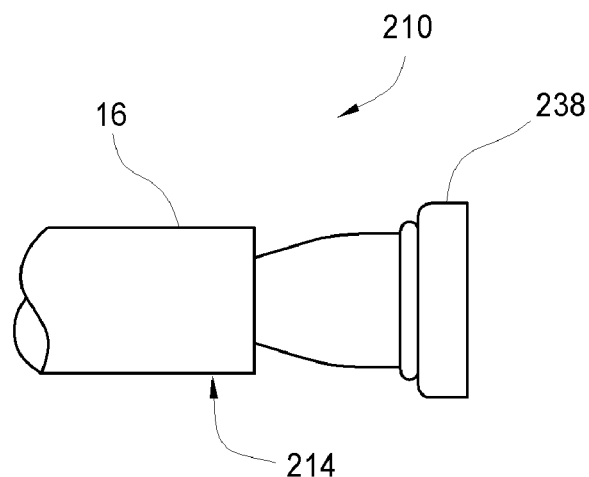
FIG. 6 is fragmentary view of an alternative embodiment employing a traditional brass instrument mouthpiece.

Referring now to FIG. 6, there appears an alternative embodiment device 210 having a conventional brass instrument mouthpiece 238, such as a traditional trumpet, cornet, or trombone mouthpiece as an alternative to the mouthpiece 38 of FIGS. 1-4. The mouthpiece 238 is received coaxially within the second end 214 of the pipe 16. The mouthpiece 238 may be permanently affixed within the end 214 of the pipe 16, e.g., via an adhesive, or, may be removably secured therein, e.g., via a friction fit.

Referring again to FIGS. 1-4, the device 10, as illustrated, additionally includes a lateral embouchure hole or tone hole 40 formed in the tube member 16 intermediate the first end 12 and the second end 14. The depicted tone hole 40 is circular, however, other tone hole shapes, such as oval and others, are contemplated. The tone hole 40 is adapted to be played in the manner of a transverse or side-blown flute, such as a concert flute, piccolo, or other member of the transverse flute family.

The tone hole 40 is preferably formed near the first end 12. In operation, when the device 10 is played transversely using the tone hole 40, the reed 32 is preferably removed from the mouthpiece 22, although a tone may also be produced with the reed 32 in place.

Although the present development is shown and described primarily by way of reference to the preferred embodiment having the lateral tone hole 40, alternative embodiments (not shown) are contemplated wherein the lateral tone hole 40 is omitted. In such embodiments, the training device may be used as an instructional aid for single-reed and brass wind instruments.

With continued reference to FIGS. 1-4, the device 10 advantageously allows music students to experience and develop proper embouchure formation for brass, reed, and transverse wind instruments. Students can focus their attention on producing one pitch properly using each type of mouthpiece. The device 10 may also be used to teach hand positions when the reed and flute mouthpieces are employed.

Additionally, the device can be used to teach articulation techniques, proper posture and breath support for each of the three types of wind instruments. In particularly preferred embodiments, the dimensions of the instrument can be selected such that each mouthpiece, when played properly, will produce some predetermined pitch, preferably a reference or standard concert pitch. In this manner, the student can compare the pitch produced with the device 10 with the predetermined pitch, e.g., using an electronic tuner or by comparing the pitch produced to a reference pitch tuned to the predetermined pitch, such as a pitch pipe, piano, tuning fork, electronic tone generator, or the like. The devices can also be used for single note playing and improvisation, rhythmic training and notation studies, and so forth.

In especially preferred embodiment, the device 10 may advantageously employ an elongate body 16 fabricated from ½-inch diameter plastic pipe which is 20⅝ inches in length, a brass mouthpiece 38 and a reed mouthpiece fitting 36 each fabricated from a conventional ½-inch to ¾-inch diameter plastic pipe coupling at the ends 14 and 12. Such a construction, when played with a traditional clarinet mouthpiece 22, will produce the concert pitch c when played properly with the tone hole 40 closed. The tone hole may be covered with the player's thumb (or, in an alternative dual-mouthpiece embodiment wherein the tone hole is omitted). The device will also produce the note b' (approximately) when played with the clarinet mouthpiece 22 and with the tone hole 40 open.

When played using the trumpet mouthpiece 38 with a reedless clarinet mouthpiece and with the tone hole 40 covered (or omitted), the device 10 constructed as detailed above will produce the notes G, d, and g' naturally in its overtone series.

When a device 10 constructed as described above is provided with a ⅜-inch diameter tone hole 40 having its center positioned approximately 2 7/16 inches from the first end 12 of the pipe 16 and properly played using the flute mouthpiece 40 with a reedless clarinet mouthpiece 22 at the first end 12, the device will produce the note b".

The device 10 is appropriate for use with all manner of students ranging from children to adults. For example, the device may be used with beginning band students who have yet to select an instrument for in-depth study for the purpose of identifying an instrument or instrument family that would be a good match for each individual student. Likewise, the device could be used by college music students, who generally must achieve a basic level of proficiency on a variety of instruments. Using the device 10, such students can conveniently practice a variety of instrument types, including instrument types that they may not own without the need for locating an instrument which may have limited availability. Furthermore, the simplicity of the device makes it ideal for use by many students with learning disabilities as well as those with certain physical handicaps who might otherwise be unable to play a more complicated traditional instrument.

The present device 10 may be provided in the form of a kit wherein the individual components for constructing the apparatus 10 may be provided disassembled or partially disassembled.

Although the present apparatus is primarily a teaching aid, it will be recognized that the devices could also be used for musical performances, including performance of single note compositions or improvisations. Also, the size of the devices 10 may be varied to produce a desired pitch and a kit comprising a tuned set of devices may be provided. For example, a set of devices may be provided wherein each is tuned to a different note. Such a set may include the notes of a particular scale, including without limitation pentatonic, diatonic, and chromatic scales, etc., or the notes otherwise required to play one or more musical pieces. Such a tuned set of devices may be used for ensemble playing, with each player in the ensemble being assigned one or more devices having a particular pitch to be played at appropriate times.

Figure 7:
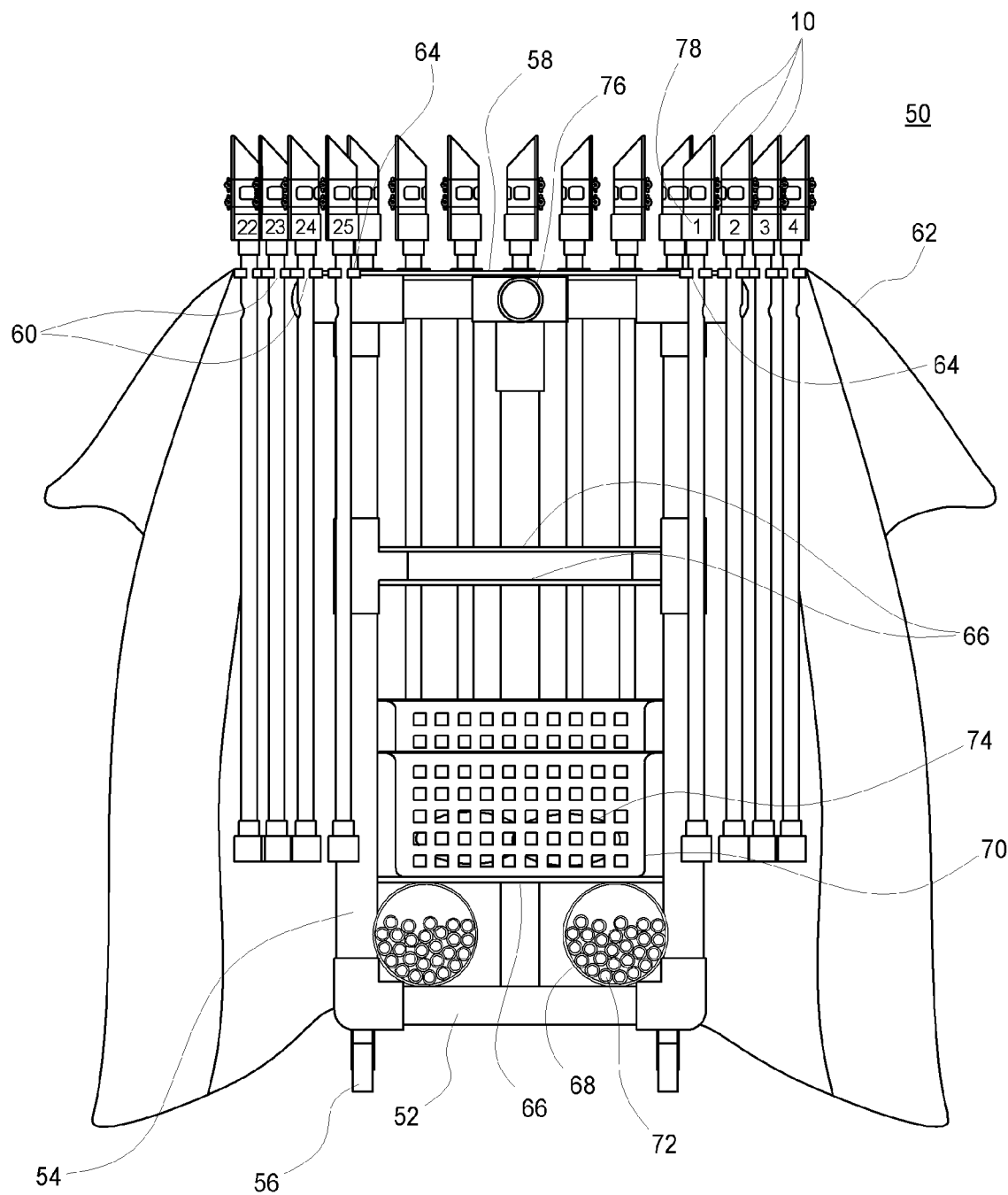
FIG. 7 is an exemplary embodiment of a kit or system which may advantageously be used for teaching a class of students.

In a further embodiment, a set of identical devices 10, for example, from about 10-30, may be provided for a program of instruction for a class of students. Such a program may range from one day to a semester or year-long course. Referring now to FIG. 7, there is shown a system or kit 50 adapted for classroom instruction. The kit 50 includes a cart 52 having a frame or body 54. The frame 54 advantageously includes wheels or casters 56 for ease of transport and a top surface 58. The top surface may service as a table top and may be used for placement of the reeds 32 when not in use and other objects. The table top 58 includes a plurality of cutout regions 60 spaced about the periphery of the top 58, each cutout 60 adapted to removably receive and suspend one of devices 10.

A skirt or apron 62, shown partially removed in FIG. 7 for ease of exposition, may be secured about the periphery of the table 58, e.g., using hook and loop fasteners 64, to retain the devices 10 within the slots 60 for transport or storage. The frame 54 may additionally include storage shelves 66 and additional storage compartments 68, 70. For example, the shelves and/or storage compartments may be used to store other instruments or materials included in the course of study. For example, the depicted kit 50 additionally includes a set of drum sticks 72 and practice pads 74 which may be used to additionally provide percussion instruction. A handle 76 may be provided for maneuvering the cart 50. The frame 54 may advantageously be formed of plastic pipe and fittings, although other materials are contemplated. Each of the devices 10 may have numerical or other indicia 78 identifying the instrument or associating a given instrument 10 with a particular student in a class.

Although the present device 10 has been described primarily herein by way of reference the presently preferred embodiment which may be readily constructed from standard pipe and pipe fittings and a traditional clarinet mouthpiece, it will be recognized that either or both of the brass mouthpiece 38 and the clarinet mouthpiece 22 may be integrally formed with the pipe 16, e.g., via a molding and/or machining process. In certain embodiments, the tube 16, brass mouthpiece (e.g., mouthpieces 38 or 238) and clarinet mouthpiece (e.g., mouthpieces 22 or 122) may be integrally formed (e.g., via a molding and/or machining process) with the tube 16 to form an integral or monolithic unit.

Figure 8:
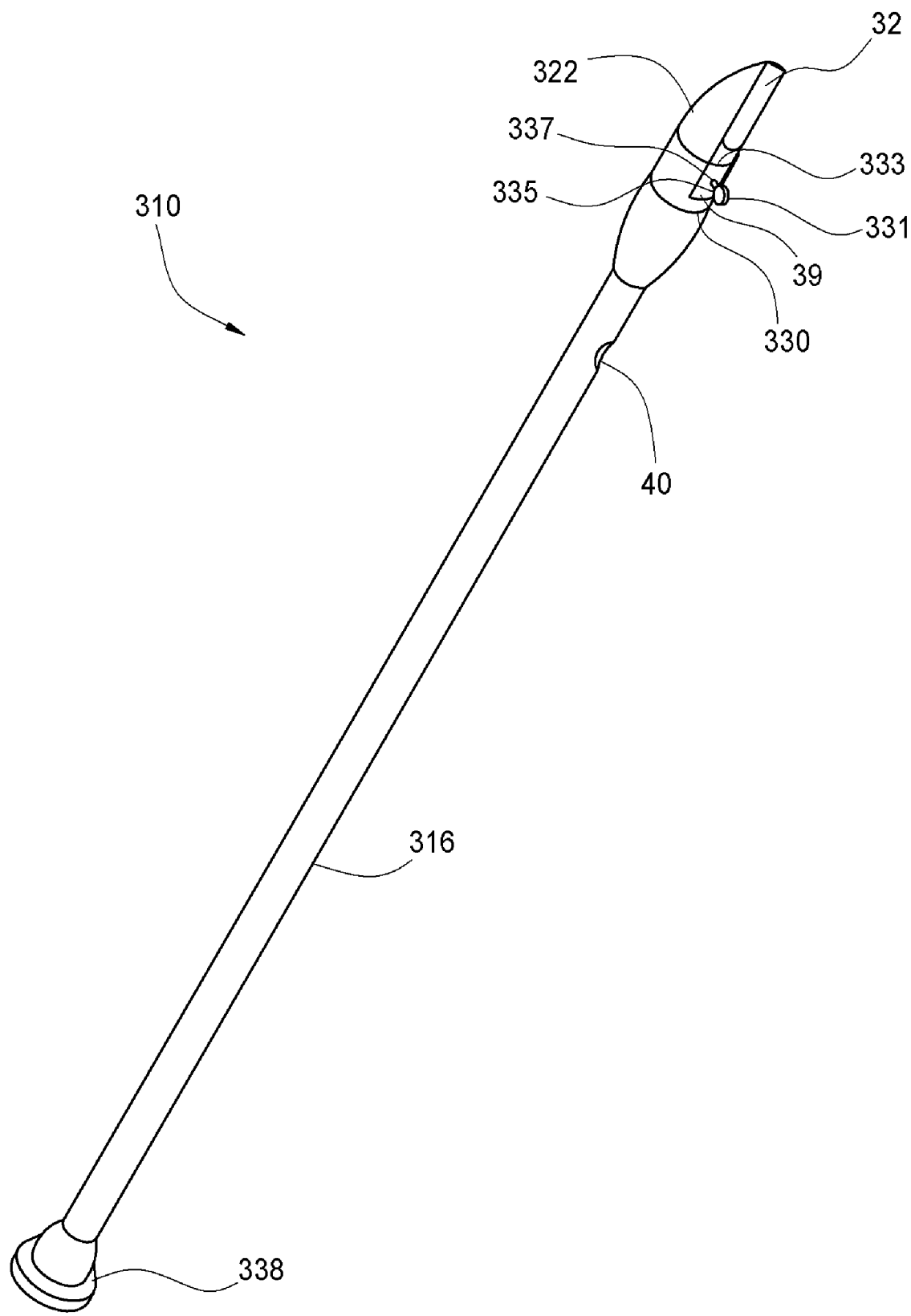
FIG. 8 is a perspective view of a further embodiment instrument device having both a single-reed instrument mouthpiece and a brass instrument mouthpiece integrally formed with the elongate body.

In alternative embodiments, the instruments described herein may be modified such that either or both of the reed mouthpiece and the brass instrument mouthpiece may be integrally formed with the elongate body portion. For example, in FIG. 8 there is depicted an exemplary instrument 310 having both a reed mouthpiece 322 and a brass instrument mouthpiece 338 integrally formed with an elongate body portion 316. An optional tone hole 40 is provided on the elongate body portion 316. An integral or permanently attached ligature portion 330 includes a slot or opening 333 for receiving the butt end 39 of the reed 32. A set screw 331 includes a threaded rod portion 335 rotatably engaging a complimentary tapped opening 337 in the ligature portion 330. The set screw 331 is rotatable in opposite directions for alternately securing and removing the reed 32 from the mouthpiece 322.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A musical instrument training device, comprising:
   an elongate body having first end and a second end opposite the first end, said elongate body defining an internal bore extending longitudinally between said first and second ends;
   a single-reed instrument mouthpiece coupled to said first end; and
   a brass instrument mouthpiece coupled to said second end.

2. The device of claim 1, further comprising:
   a lateral embouchure hole formed in a wall of said elongate body.

3. The device of claim 2, further comprising:
   said elongate body being formed of a plastic material; and
   said brass instrument mouthpiece being separately formed from a material selected from a plastic, metal, or metal alloy.

4. The device of claim 2, further comprising:
   a fitting attached to said first end of said elongate body, said fitting defining an opening, said opening sized to receive a portion of said single-reed instrument mouthpiece; and
   optionally, an annular sealing member for providing a sealing engagement between said opening and the received portion of said single-reed instrument mouthpiece.

5. The device of claim 4, wherein said annular sealing member is formed of cork.

6. The device of claim 2, further comprising one or both of:
   said elongate body and said single-reed instrument mouthpiece being integrally formed; and
   said elongate body and said brass instrument mouthpiece being integrally formed.

7. The device of claim 2, further comprising one or both of:
   said single-reed instrument mouthpiece being a traditional clarinet mouthpiece; and
   said brass instrument mouthpiece being a traditional trumpet mouthpiece.

8. The device of claim 2, further comprising:
   said elongate body, said single-reed instrument mouthpiece, and said brass instrument mouthpiece being integrally formed.

9. The device of claim 2, further comprising:
   said single-reed instrument mouthpiece having a ligature for removably attaching a reed, said ligature selected from a removable annular band and an integrally formed ligature having a longitudinally extending slot for receiving a reed.

10. A kit having component parts capable of being packaged in a disassembled or partially disassembled form and of being assembled into a musical instrument training device having a plurality of wind instrument mouthpiece types, said kit comprising:
    an elongate body having first end and a second end opposite the first end, said elongate body defining an internal bore extending longitudinally between said first and second ends;
    one of: (a) a single-reed instrument mouthpiece integrally coupled to said first end; and (b) a single-reed instrument mouthpiece adapted to be removably coupled to said first end; and
    one of: (a) a brass instrument mouthpiece integrally coupled to said second end; and (b) a brass instrument mouthpiece adapted to be removably coupled to said second end.

11. A musical instrument training system, comprising:
    a plurality of musical instrument training devices, each of said musical instrument training devices including:
    an elongate body having first end and a second end opposite the first end, said elongate body defining an internal bore extending longitudinally between said first and second ends;
    a single-reed instrument mouthpiece coupled to said first end; and
    a brass instrument mouthpiece coupled to said second end.

12. The system of claim 11, further comprising:
    a cart for storage of said plurality of musical instrument training devices.

13. The system of claim 12, further comprising:
    said cart including a frame, a plurality of wheels attached to the frame, and a platform connected to the top of the frame, said platform including a plurality of receptacles spaced about its periphery for receiving said plurality of musical instrument training devices.

14. The system of claim 13, wherein the number of musical instrument training devices is greater than or equal to a number of students in a class of students to be trained.

15. The system of claim 13, further comprising:
    indicia on each of said musical instrument training devices for one or both of identifying each one of said musical instrument training devices and associating each of said plurality of musical instrument training devices with a particular student.

16. The system of claim 11, further comprising:
    each of said plurality of musical instrument training devices having the same pitch.

17. The system of claim 11, further comprising:
    said plurality of musical instrument training devices comprising a tuned set of musical instrument training devices having different pitches.

18. A method of teaching a student proper embouchures for playing a plurality of instruments, comprising:
provide a musical instrument training device including an elongate body having first end and a second end opposite the first end, said elongate body defining an internal bore extending longitudinally between said first and second ends; a single-reed instrument mouthpiece coupled to said first end; and a brass instrument mouthpiece coupled to said second end; and, optionally, a lateral embouchure hole formed in a wall of said elongate body and forming a transverse mouthpiece;
for each mouthpiece, said musical instrument training device configured to produce a predetermined pitch when played with a proper embouchure;
for each mouthpiece, allowing the student to play said musical instrument training device to produce a tone; and
for each mouthpiece, comparing the pitch of the tone produced by the student to said predetermined pitch.

19. The device of claim 2, further comprising:
said single-reed instrument mouthpiece having an integrally formed ligature having a longitudinally extending slot for receiving a reed.

\* \* \* \* \*